(12) United States Patent
Segev et al.

(10) Patent No.: US 11,301,153 B2
(45) Date of Patent: Apr. 12, 2022

(54) HIGH-THROUGHPUT OUT-OF-ORDER CIPHER TEXT STEALING

(71) Applicant: Western Digital Technologies, Inc., San Jose, CA (US)

(72) Inventors: Amir Segev, Meitar (IL); Yuval Yoskovits, Beer Sheva (IL); Shay Benisty, Beer Sheva (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/899,580

(22) Filed: Jun. 12, 2020

(65) Prior Publication Data

US 2021/0389875 A1    Dec. 16, 2021

(51) Int. Cl.
  *G06F 3/06*   (2006.01)
  *G06F 21/78*  (2013.01)
  *G06F 21/60*  (2013.01)

(52) U.S. Cl.
  CPC ............ *G06F 3/064* (2013.01); *G06F 3/0619* (2013.01); *G06F 3/0622* (2013.01); *G06F 3/0656* (2013.01); *G06F 3/0659* (2013.01); *G06F 3/0673* (2013.01); *G06F 21/602* (2013.01); *G06F 21/78* (2013.01)

(58) Field of Classification Search
  CPC ...... G06F 3/0619; G06F 3/064; G06F 3/0673; G06F 21/602
  See application file for complete search history.

(56) References Cited

U.S. PATENT DOCUMENTS

2014/0351526 A1 * 11/2014 Peterson ............... G06F 13/287
                                                711/149
2020/0119903 A1 *  4/2020 Thomas ................ H04L 9/0643

FOREIGN PATENT DOCUMENTS

CN    107888373 A    4/2018
CN    107888374 A    4/2018

OTHER PUBLICATIONS

Dworkin, M., "Recommendation for Block Cipher Modes of Operation: The XTS-AES Mode for Confidentiality on Storage Devices", NIST Special Publication 800-38E, Jan. 2010.
Ahmed, Shakil, et al., "Efficient AES-XTS Pipelined Implementation on FPGA", Sir Syed University REsearch Journal of Engineering and Technology, vol. 4, Issue 1, 2014.
"IEEE Standard for Cryptographic Protection of Data on Block-Orientated Storage Devices", IEEE Computer Society, IEEE Std 1619-2018 (Revision of IEEE std 1619-2007).

* cited by examiner

*Primary Examiner* — Edward J Dudek, Jr.
(74) *Attorney, Agent, or Firm* — Patent Law Works LLP

(57) ABSTRACT

A method and device for out-of-order cryptographic processing to eliminate or ameliorate data dependency stalls, in the cryptographic pipeline of a data storage device, resulting from the application of cipher text stealing. A cryptographic processing pipeline performs the steps of: a) cryptographically process a penultimate data block, to produce a penultimate processed data block, and store a portion of the penultimate processed data block in the memory store; b) cryptographically process at least one leading data block, to produce at least one processed leading data block; and c) cryptographically process a concatenation of a last data block and the portion of the penultimate processed data block, to produce a last processed data block, wherein the cryptographic processing pipeline starts to perform step b) before completing step a).

20 Claims, 10 Drawing Sheets

HIGH-THROUGHPUT OUT-OF-ORDER CIPHER TEXT STEALING

TECHNICAL FIELD

The present disclosure relates to the field of data storage devices, and in particular, the encryption and decryption of data stored on data storage devices.

BACKGROUND

A data storage device is used to store user content data (e.g., in the form of files). A data storage device incorporates a storage medium on which the files are written and from which the files are read. A data storage device can be communicatively connected to a host computer system to provide the host computer system with a means to write files to the storage medium and read files from the storage medium.

A data storage device may incorporate a security engine, as known as a cryptographic processing unit, configured to perform encryption and/or decryption of files and other data stored on the storage medium. Accordingly, the data storage device may be configured to perform encryption of plaintext data being written to or read from the storage medium. Furthermore, in some cases, a data storage device may be configured to perform decryption of encrypted data being written to or read from the storage medium.

To achieve preferred responsiveness of reading and writing operations to the data storage device, it is desirable to achieve a low latency and a high throughput of data through the security engine during the encryption or decryption process. Accordingly, it is desirable to configure a security engine to facilitate high throughput performance, whilst satisfying the specifications of a cryptographic algorithm supported by the security engine.

SUMMARY

The present disclosure provides a method and device for out-of-order cryptographic processing to eliminate or ameliorate data dependency stalls, in the cryptographic pipeline of a data storage device, resulting from the application of cipher text stealing techniques.

According to one aspect of the disclosure there is provided, a data storage device comprising, a non-transitory storage medium, and a cryptographic processing unit, integrated with the data storage device, and configured to perform cryptographic processing of a data object to produce a processed data object, wherein the data object comprises a sequence of data blocks, including, one or more leading data blocks, a penultimate data block, and a last data block, the cryptographic processing unit comprises, a memory store, a cryptographic processing pipeline, and a pipeline controller, the pipeline controller is configured to control the cryptographic processing pipeline to perform the steps of: a) cryptographically process the penultimate data block, to produce a penultimate processed data block, and store a portion of the penultimate processed data block in the memory store; b) cryptographically process at least one of the one or more leading data blocks, to produce one or more processed leading data blocks; and c) cryptographically process a concatenation of the last data block and the portion of the penultimate processed data block, to produce a last processed data block, the pipeline controller is further configured to control the cryptographic processing pipeline to start to perform step b) before the cryptographic processing pipeline completes step a).

In one embodiment, performing cryptographic processing comprises performing encryption. In one embodiment, performing cryptographic processing comprises performing decryption.

In one embodiment, each leading data block has a size equal to a set block size, the penultimate block has a size equal to a set block size, and the last block has a size less than the set block size.

In one embodiment, the cryptographic processing pipeline comprises a plurality of pipeline stages comprising, at least, a first stage and a second stage. In one embodiment, the pipeline controller is further configured to control the first stage of the cryptographic processing pipeline to start to perform step b) while the second stage of the cryptographic processing pipeline continues to perform step a). In one embodiment, the cryptographic processing pipeline is clocked by a clock signal. In one embodiment, the cryptographic processing pipeline stores the portion of the penultimate processed block in the memory store at least one clock cycle of the clock signal before the input stage of the cryptographic processing pipeline starts to perform step c).

In one embodiment, the cryptographic processing pipeline processes all of the one or more leading data blocks in step b).

In one embodiment, the data storage device further comprises an output buffer configured to store the penultimate processed data block; and an output port configured to output processed data blocks from the cryptographic processing unit, and output the last processed data block before outputting the penultimate processed data block, stored in the output buffer.

In one embodiment, the data storage device further comprises an input port in communication with a source of data blocks of the data object, wherein the cryptographic processing unit is configured to request and receive data blocks of the data object from the source via the input port.

In one embodiment, the cryptographic processing unit is further configured to: request and receive a first portion of the data object from the source via the input port, the first portion including the penultimate block; and then request and receive a second portion of the data object from the source via the input port, the second portion including at least one of the one or more leading data blocks.

In one embodiment, step a) comprises determining a tweak value associated with the penultimate data block. In one embodiment, the cryptographic processing unit is configured to determine the tweak value associated with the penultimate data block before performing step a). In one embodiment, the cryptographic processing unit is configured to calculate a tweak value for each block in the sequence of blocks.

In one embodiment, the cryptographic processing unit is configured to perform encryption in accordance with the XTS-AES encryption algorithm. In one embodiment, the cryptographic processing unit is configured to perform decryption in accordance with the XTS-AES decryption algorithm.

According to another aspect of the disclosure, there is provided a method for performing cryptographic processing of a data object to produce a processed data object, the data object comprising a sequence of data blocks, including, one or more leading data blocks, a penultimate data block, and a last data block, the method comprising the ordered steps of: a) performing cryptographic processing of penultimate data block to produce a penultimate processed data block and store a portion of the penultimate processed data block in a memory store; b) performing cryptographic processing of at least one of the one or more leading data blocks to produce one or more processed leading data blocks; and c) performing cryptographic processing of a concatenation of the last data block and the portion of the penultimate processed data block stored in the memory store to produce a last processed data block, wherein step b) is started before step a) is completed.

In one embodiment, the method is performed by a cryptographic unit comprising, a memory store, a hardware circuitry pipeline, configured to encrypt a plaintext data block to produce a cipher text block, and a pipeline controller, configured to control the pipeline, According to another aspect of the disclosure, there is provided a data storage device for performing cryptographic processing of a data object to produce a processed data object, the data object comprising a sequence of data blocks, including, one or more leading data blocks, a penultimate data block, and a last data block, the data storage device comprising means for: a) cryptographically processing the penultimate data block, to produce a penultimate processed data block, and storing a portion of the penultimate processed data block in a memory store; b) cryptographically processing at least one of the one or more leading data blocks, to produce one or more processed leading data blocks; and c) cryptographically processing a concatenation of the last data block and the portion of the penultimate processed data block, to produce a last processed data block, wherein step b) is started before step a) is completed.

BRIEF DESCRIPTION OF DRAWINGS

A non-limiting example will now be described with reference to the following drawings, in which.

DESCRIPTION OF EMBODIMENTS

Data Storage Device

Figure 1:
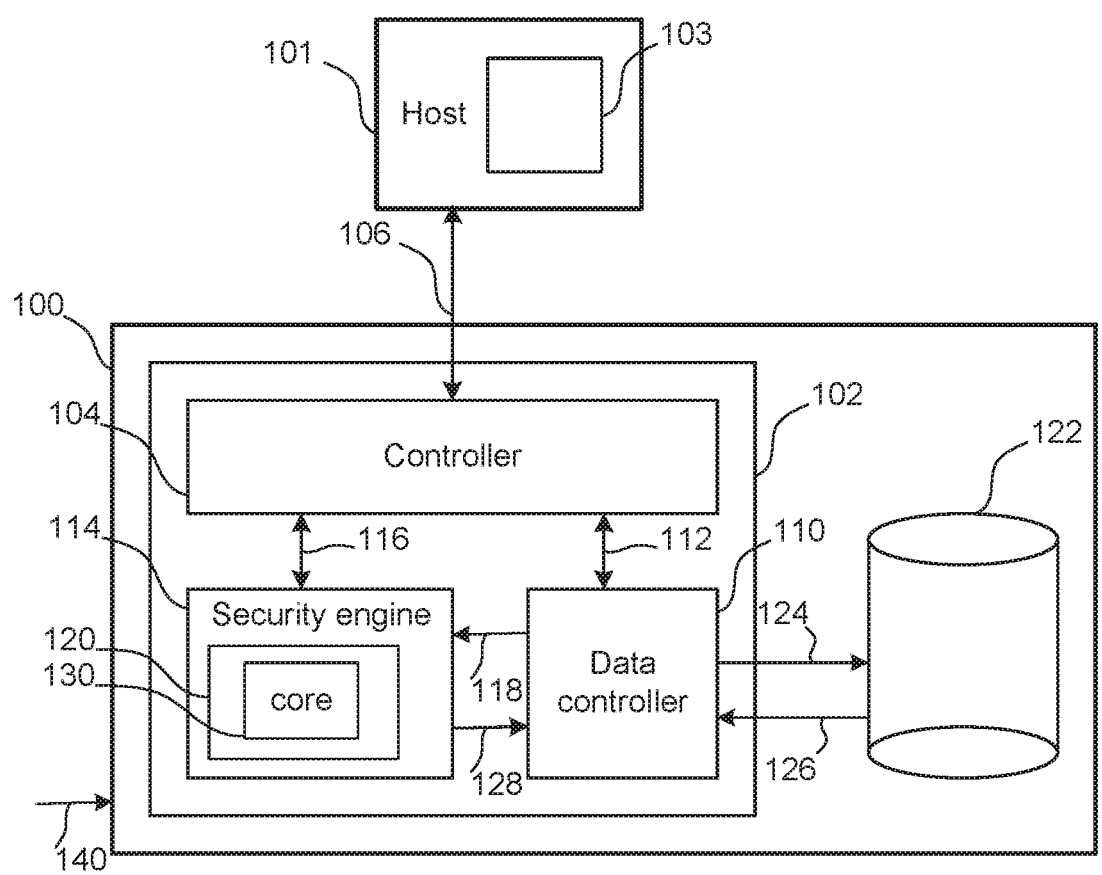
FIG. 1 is a block diagram illustrating a computer network including a data storage device and a host device, according to an embodiment.

FIG. 1 is a block diagram illustrating components of a data storage device 100 which is communicatively coupled to a host device 101, according to an embodiment. The data storage device 100 comprises a storage medium 122 and control circuitry 102 integrated within a device housing.

The storage medium 122 is configured to store user data. In some embodiments, the storage medium 122 is also configured to store control data. Data within the storage medium 122 is stored as individual data objects, or files, and the storage medium 122 incorporates a file registry which catalogues the storage location and other details of the data objects stored within the storage medium 122. In one embodiment, the storage medium is NAND flash memory.

The data storage device 100 is configured to be communicatively coupled to the host device 101 via communication bus 106. Bus 106 is configured to transmit control signals and data signals. The data storage device 100 receives data signals and control signals from the host device, via bus 106, and provides data signals and information signals to the host device 101, via bus 106.

In the embodiment illustrated in FIG. 1, bus 106 is a peripheral component interconnect express (PCIe) bus; however, in other embodiments, other bus configurations may be used to provide data and control communication between the data storage device and the host device.

The control circuitry 102 is configured to receive data processing commands from the host device 101, via bus 106. In one embodiment, the control circuitry 102 of the data storage device 100 is configured to receive a read request from the host device 101. In response to receiving such a request, the control circuitry 102 is configured to transmit a data object from the storage medium 122 to the host device 101, via communication bus 106. Similarly, in one embodiment, the control circuitry 102 of the data storage device 100 is configured to receive a write request from the host device 101 along with a data object communicated to the data storage device 100 from the host device 101 via the communication bus 106. In response to receiving the write request, the control circuitry 102 is configured to write the data object to the storage medium 122.

Host Memory

The host device 101 comprises a memory store 103. In one embodiment, the memory store 103 comprises dynamic random-access memory (DRAM). User data is transferred to and from the host device's memory store 103 and the data storage device's storage medium 122. In one embodiment, the data storage device controller 104 is configured to read user data from the host device's memory store 103 and to write the user data to the storage medium 122. The data storage device controller 104 is also configured to read user data from the data storage device's storage medium 122 and to transmit the user data to the host device 101.

In one embodiment, the host device 101 is configured to push user data from the host device's memory store 103 to the data storage device 100, and the data storage device 100 is configured to write the pushed user data to the storage medium 122. In one embodiment, the host device 101 is configured to perform a pull function, in which the host device 101 transmits a pull request for user data to the data storage device 100. In response to receiving the pull request, the data storage device 100 is configured to transmit user data from the storage medium 122 to the host device 101. As user data is written to and read from the storage medium 122, the security engine performs cryptographic processing (encryption or decryption) on the user data to produce processed data.

The user data on host memory store 103 is organized in either contiguous or non-contiguous data chunks. In some embodiments, the data includes an additional chunk of metadata information.

Security Engine

The data storage device 100 also comprises a security engine 114, which is configured to perform cryptographic operations, such as encryption or decryption, on data objects being written to the storage medium 122 from the host device 101, or read from the storage medium 122 by the host device 101.

The operation of the security engine 114 is controlled by the controller 104, and the security engine 114 reads and provides data to the data controller 110 via buses 118 and 128, respectively. During write operations, the data controller 110 writes data blocks to the storage medium 122 via bus 124. In some embodiments, the data controller 110 provides buffering and reordering of the blocks before writing to the storage medium 122. During read operations, the data controller 110 reads data blocks from the storage medium 122.

AES ALU

A security engine 114 comprises one or more Arithmetic Logic Units (ALUs) configured to perform cryptographic processing in accordance with one or more cryptographic algorithms. A security engine performs cryptographic processing in accordance with cryptographic information associated with the data objects, or cryptographic information specified by the host device.

In the embodiment illustrated in FIG. 1, the security engine 114 includes an ALU configured to perform encryption and decryption in accordance with the Advanced Encryption Standard (AES) established by the United States National Institute of Standards and Technology (NIST). The AES ALU 120 comprises control circuitry as well as a cryptography core, AES core 130.

The AES core 130 is configured to cryptographically process blocks of data which are a set block size. In encryption mode, the AES core 130 works on encrypting a block of plaintext data equal to the set block size. The set block size is set in accordance with the cryptographic algorithm, or mode thereof, of the cryptographic core. In the embodiment shown in FIG. 1, the set block size of the AES core 130 is 16 bytes.

Advanced Encryption Standard (AES)

AES is a symmetric-key cryptography suite defined by the National Institute of Standards and Technology (NIST). AES comprises a block cipher algorithm which incorporates cipher block chaining. AES encrypts plaintext data in blocks of a set block size.

To encrypt a plaintext data object larger than the set block size, AES uses a block cipher mode. A block cipher is a cipher in which a data object is divided into a sequence of blocks, and the bits of each block are encrypted as a single unit, with a cipher key applied to the entire block.

A plurality of AES block cipher modes are described in the Advanced Encryption Standard. One such block cipher mode is Cipher Block Chaining (CBC) which can be used for encrypting data stored on a data storage device.

CBC uses a chaining mechanism during encryption of a sequence of plaintext blocks, such that the decryption of a block of cipher text depends on all the preceding cipher text blocks. As a result, the validity of all preceding blocks is contained in the immediately previous cipher text block. In one embodiment, CBC performs an exclusive-or (XOR) operation between each plaintext block and the immediately previous cipher text block, and then encrypts the result. For the first block there is no immediately previous block, so CBC applies an initialisation vector to the first plaintext block in the sequence of blocks during encryption.

Pipeline Architecture

To increase throughput of the cryptographic process, the AES core 130 has a pipelined architecture comprising a series of pipelined stages configured to perform subsections of the AES cryptographic process, on a block of data. The AES core 130 takes one block of data at a time, moving the data through the pipeline stages, until the cryptographically processed block of data is produced at the output.

The AES core 130 is synchronised by a clock signal and on each clock cycle, one block of output data (being plaintext data in the case of decryption and cipher text data in the case of encryption) is available, assuming the continuous provision of input data at the start of the pipeline.

The AES core 130, according to the embodiment illustrated in FIG. 1, comprises six pipeline stages. In an alternate embodiment, an AES core may comprise a pipeline architecture comprising fewer or more pipeline stages. In some embodiments, an AES core may comprise a pipeline of many stages, wherein each pipeline stage may process a small subset of the AES algorithm, and each pipeline stage has a short critical path. Alternatively, an AES core may be designed with fewer pipeline stages, wherein each pipeline stage has a relatively longer critical path. The way in which the pipeline architecture of the AES core is configured may depend upon the implementation constraints of the AES ALU 120, such as clock frequency, foot print, cost and performance.

Sequence of Blocks

As mentioned above, the AES algorithm is a block cipher algorithm, in which a plaintext data object is divided into a sequence of blocks, and the bits of each block are encrypted as a single unit, with a cipher key applied to the entire block.

In some cases, the plaintext to be encrypted is of a size which is not equally divisible by the set block size of the AES core 130. In other words, the plaintext is not of a size that is an integer multiple of the set block size. Accordingly, once the plaintext has been segmented into blocks of the set block size, there is a last block which has a size less than the set block size.

Figure 2:
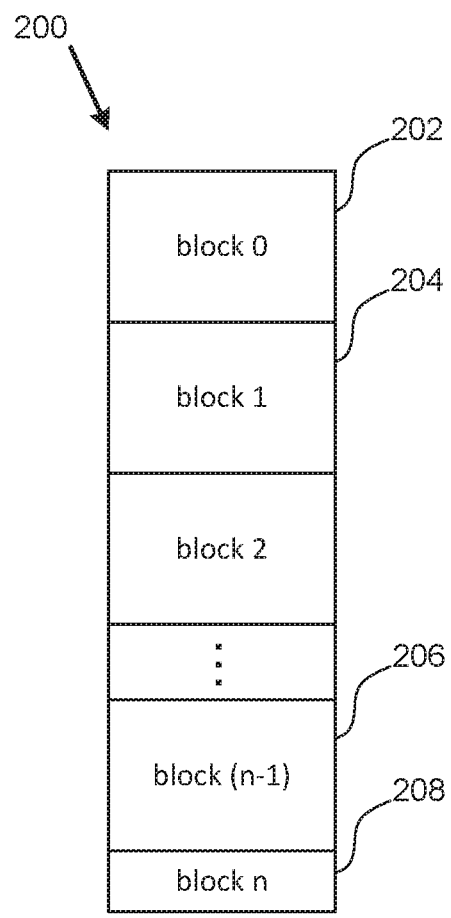
FIG. 2 is a block diagram illustrating a data object segmented into a sequence of blocks, according to an embodiment.

FIG. 2 is a block diagram which illustrates, in accordance with an embodiment, a plaintext data object 200, which is logically divided into a sequence of blocks 0 to n, such that the sequence of blocks, from the first block, 202, to the last block, 208, comprises the whole plaintext data object. Block (n−1), 206, is the penultimate (or second-to-last) block in the sequence 200, block n, 208, is the last block, and blocks 0 to (n−2) are the leading blocks of the data object.

The blocks from block 202 to block 206 are each of a size equal to the set block size of the AES core 130, whereas block 208 is smaller than the set block size.

In accordance with another embodiment, FIG. 2 depicts a cipher text data object 200, which is divided into a sequence of blocks 0 to n. In this embodiment, block 208 is the last block, block 206 is the penultimate block, and blocks 0 to block (n−2) comprise the leading blocks.

To cryptographically process (i.e., encrypt or decrypt) the last block 208, which has a size less than the set block size, the AES ALU 120 applies cipher text stealing (CTS), as described below.

Cipher Text Stealing (CTS)

Cipher text stealing (CTS) uses a block cipher mode of operation that enables encryption of plaintext data objects that are not evenly divisible into blocks of a set block size. In contrast to other methods, CTS does not need to expand the cipher text through padding of the plaintext. Accordingly, by applying CTS during encryption, the resulting cipher text can be the same size as the plaintext data object.

In the process of performing CTS, the AES ALU 120 uses a different encryption method for the last two blocks of the plaintext data object than for the leading blocks. More particularly, in one embodiment, the AES ALU 120 'steals' a portion of the cipher text resulting from encryption of the penultimate plaintext block to pad the last plaintext block, so that the last plaintext block is of the set block size. The padded last plaintext block is then encrypted by the AES core 130, to produce a cipher text block.

Accordingly, the final two cipher text blocks consist of a truncated penultimate cipher text block (with the stolen portion omitted) and the full last cipher text block. The cipher text blocks, considered in total, are the same size as the original plaintext.

In some embodiments, the full last cipher text block is stored or transmitted ahead of the truncated penultimate cipher text block. Accordingly, in these embodiments, decryption comprises decrypting the last block before the penultimate block, then restoring the stolen cipher text portion to the penultimate block, which can then be decrypted as usual.

XEX-based tweaked-codebook mode with cipher text stealing (XTS-AES) is a mode of AES which incorporates cipher text stealing. XTS-AES utilises Xor-Encrypt-Xor (XEX) operations and is standardized by IEEE Standard 1619-2007. XTS-AES mode can be used in storage devices for user data.

Cipher Text Stealing Example

Figure 3:
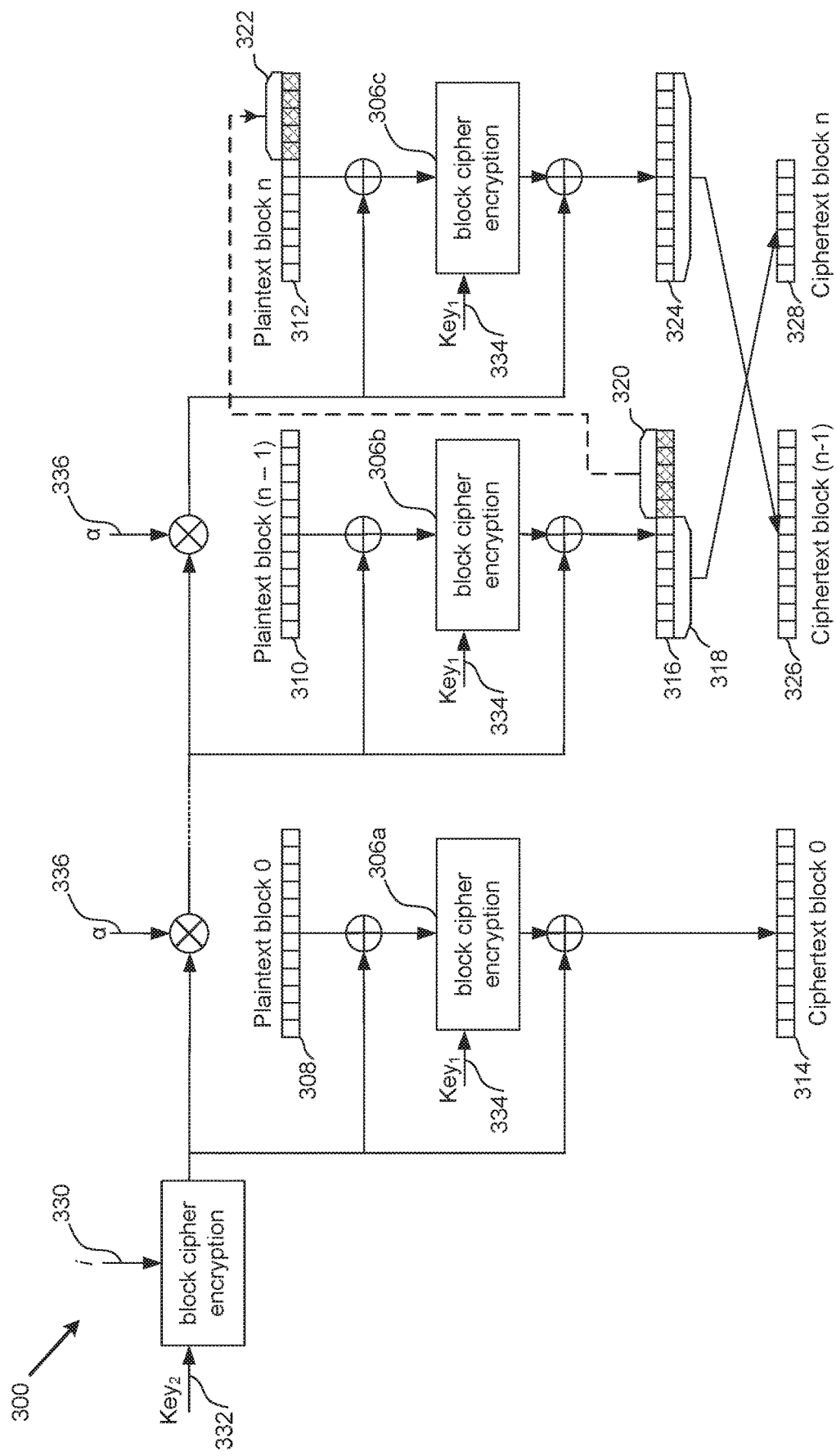
FIG. 3 is a block diagram illustrating the application of cipher text stealing to a sequence of blocks, according to an embodiment.

FIG. 3 is a block diagram illustrating the steps of performing cipher text stealing during encryption of a sequence of blocks, according to an embodiment. Specifically, FIG. 3 illustrates an example where a plaintext data object, comprising blocks 0 to n, is encrypted in accordance with an encryption algorithm incorporating cipher text stealing (CTS), such as XTS-AES.

In the embodiment illustrated in FIG. 3, encryption of the first block is performed through application of an initialisation vector 330 and an encryption key, Key$_2$ 332. Encryption of subsequent blocks of a sequence of blocks is performed through application of an encryption key, Key$_1$ 334.

Logic modules 306a-c represent encryption logic performing encryption of an input plaintext block to produce a cipher text block. In a hardware implementation, modules 306a-c may be implemented as multiple instances of a logic module or as a single, re-usable logic module in a single logic core, such as AES core 130, which encrypts blocks 0 to n in sequence via a pipelined encryption architecture.

The AES core 130 encrypts penultimate plaintext block (n−1), indicated by reference numeral 310, to produce cipher text block 316. Cipher text block 316 is comprised of cipher text portion 318 (referred to as the 'truncated penultimate processed block') and cipher text portion 320 (referred to as the 'stolen cipher text portion' 320). Stolen cipher text portion 320 is of size equal to the shortfall between the size of last plaintext block n 312 and the encryption block size of the AES core 130. Stolen cipher text portion 320 is appended to the last plaintext block n 312, so that the combination of stolen cipher text portion 320 and last plaintext block n 312 is equal to the encryption block size.

Output Order

In the embodiment illustrated in FIG. 3, the output order of the cipher text corresponding to penultimate plaintext block (n−1) 310 and last plaintext block n 312 is switched, in accordance with the XTS-AES algorithm. Specifically, the cipher text block 324, produced by the encryption of last plaintext block n 312 with appended stolen cipher text portion 322, is output before cipher text portion 318, produced by the encryption of penultimate plaintext block (n−1) 310.

Additionally, cipher text block n, indicated by reference numeral 328, comprises only truncated penultimate processed block 318 of cipher text block 316. As a result, the total size of cipher text block 0, 314, to cipher text block n, 328, is equal to the total size of plaintext block 0, 308, to plaintext block n, 312.

Data Dependency

In the process of encrypting the last plaintext block n 312 to produce cipher text block 324, the AES core 130 requires the value of stolen cipher text portion 320 to append it to last plaintext block n 312. Accordingly, the AES core 130 cannot commence encryption of plaintext block n 312 until the stolen cipher text portion 320 has been calculated. Consequently, there is a data dependency on the calculation of stolen cipher text portion 320. This data dependency can cause pipeline stalls before the encryption of the last block, 312, in embodiments of the AES core which incorporate a pipelined encryption architecture. An example of such pipeline stalls are described below, in relation to FIG. 4.

Pipeline Stalls Caused by Data Dependency

Figure 4:
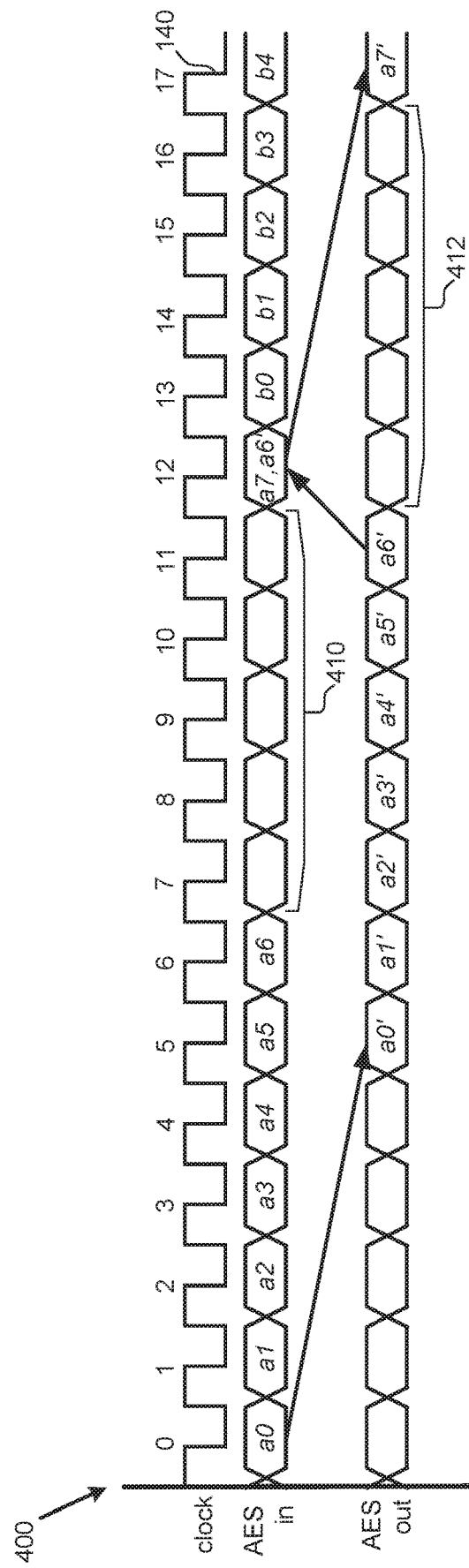
FIG. 4 is a signal timing diagram illustrating pipeline stalls, according to an embodiment.

FIG. 4 is a signal timing diagram illustrating the data signals within the AES core 130, according to an embodiment. Signal 140 is a clock signal which clocks the components of the AES core 130 on the positive edge. The 'ABS in' signal represents the contents of data input to the AES core 130. The 'ABS out' signal represents the contents of data output from the AES core 130. With reference to FIG. 4, the AES core 130 performs encryption of a plaintext file comprising data blocks a0 to a7. Accordingly, the 'ABS in' signal comprises plaintext data, and the 'ABS out' signal comprises corresponding cipher text data.

The AES core 130 comprises a six stage pipeline architecture which encrypts a plaintext block over six clock cycles, to produce a corresponding cipher text block. Accordingly, plaintext block a0 is encrypted over six clock cycles, to produce corresponding cipher text block a0' in clock cycle 5. Similarly, the AES core 130 receives plaintext blocks a1 to a6 over clock cycles 1 to 6, and produces corresponding cipher text blocks a1' to a6' over clock cycles 6 to 11.

As the AES core 130 implements an encryption mode which incorporates cipher text stealing (CTS), and the size of the final plaintext block a7 is less than the encryption block size, the AES core 130 applies cipher text stealing (CTS) to the encryption of plaintext block a7, incorporating a portion of cipher text block a6'.

To encrypt plaintext block a7, appended with a stolen portion of cipher text block a6', the AES core 130 requires access to, at least, the relevant stolen portion of cipher text block a6'; the relevant stolen portion being the bits of a6' used to pad plaintext block a6 in accordance with the cipher text stealing protocol, as described above.

The cipher text block a6' is available in clock cycle 11. Accordingly, the AES core can begin the pipelined encryption of plaintext block a7 in clock cycle 12 and provide the corresponding cipher text block a7' in clock cycle 17.

Due to data dependency on cipher text block a6' for the encryption of plaintext block a7, there is a stall within the pipeline of the AES core 130, as indicated by reference numeral 410.

In the example illustrated in FIG. 4, the encryption pipeline is six stages long, therefore, the pipeline stall 410, caused by the data dependency of a6', is six clock cycles long. The pipeline stall 410 results in a six clock cycle delay 412 of the availability of cipher text block a7' on the data output signal 404.

If the plaintext file a0 to a7 had a size that was an integer multiple of the encryption block size (meaning cipher text stealing was not required), the number of clock cycles to encrypt plaintext blocks a0 to a7 would be thirteen clock cycles. In contrast, in the example illustrated in FIG. 4, the AES core 130 implements CTS; therefore, the number of clock cycles to encrypt plaintext blocks a0 to a7, is eighteen clock cycles. Accordingly, the implementation of CTS results in an increase in latency of five clock cycles, which is an increase of 38%. This results in a reduction of throughput performance of the AES core 130 for the processing of blocks a0 to a7.

The signal timings illustrated in FIG. 4, and described in the above paragraphs, are provided for the purpose of example only. In an alternative embodiment, the number of pipeline stages, latencies, throughputs and number of blocks may differ from those illustrated in FIG. 4.

In the above description of FIG. 4, the AES core 130 has been described as performing encryption of a plaintext file comprising data blocks a0 to a7; however, FIG. 4 is also representative of the AES core 130 performing decryption of a cipher text file comprising encrypted data blocks a0 to a7, according to an embodiment.

For ease of reference, the description herein makes reference to cryptographic processing, which encompasses either performing encryption or decryption of data, where the distinction between these two cryptographic processes is not of relevance to the description of the operations performed by the components of the security engine. In use, a processed data object refers to a data object which has been either encrypted or decrypted by an embodiment described herein.

Reduced Performance

The pipeline stalls, caused by data dependencies of cipher text stealing, increase the latency of outputting a cryptographically processed data object associated with a data object. To increase the throughput performance of the AES core 130, it is desirable to reduce or eliminate stalls of the AES core pipeline, resulting from the application of CTS.

The stalls of an AES core pipeline, resulting from the application of CTS, may be eliminated by implementing the AES core as one large combinatory block. In this approach, the AES core would encrypt/decrypt a block of data in a single clock cycle, so that, when reaching the last block, the cipher text of the penultimate block is ready. A problem with this approach is that implementing the AES core as single combinatorial block increases the critical path of the AES core implementation, and may result in a lower clock rate, which reduces throughput performance.

Alternatively, the clock rate of the AES core could be increased to compensate for the loss in throughput performance resulting from the application of CTS; however, clock rate is limited by technology and often results in a higher consumption of power.

Alternatively, the loss in throughput performance, resulting from the application of CTS, may be compensated for by increasing the number of AES cores within the AES ALU 120, so long as separate data objects are available to be processed simultaneously. Disadvantageously, this approach results in an increase in footprint and power consumption of the AES ALU.

Out-of-Order Activation of the Cryptographic Core

Described herein is a method and device for out-of-order activation of the cryptographic core to ameliorate, or eliminate, the issue of pipeline stalls caused by the data dependency between the last processed block and penultimate data block, during the cryptographic processing, which comprises either encryption or decryption.

More particularly, with reference to the embodiment illustrated in FIG. 1, the AES ALU 120 activates the AES core 130 to perform cryptographic processing (including encryption and/or decryption) of a sequence of data blocks out-of-order, in the case that cipher text stealing is applicable.

Advantageously, by activating the cryptography core to process the penultimate block out-of-order, such that the penultimate processed block is available to the cryptographic core at an earlier clock cycle, the clock cycles consumed by data dependency stalls are eliminated or reduced.

To activate the cryptographic core out-of-order, the circuitry of the security engine manages the data and control signals input to the cryptographic core, such that the cryptographic core is supported to process the blocks of a data object out of sequential order. More particularly, for each block of a data object, the security engine configures the cryptographic core to correctly cryptographically process the block, by setting the input data to the cryptographic core, and setting control parameters as input to the cryptographic core. The control parameters are configured depending on block position and are timed to accommodate the pipeline stages of the cryptographic core.

The provision of input data and the block-position dependent control parameters provide the cryptographic core with the necessary information to cryptographically process each block individually and to concurrently process a plurality of non-sequential blocks.

An example of the function and structure of circuitry of a security engine, which supports the activation of a cryptographic core out-of-order, will be described with reference to the embodiment illustrated in FIG. 1. In the embodiment illustrated in FIG. 1, the circuitry of the security engine which supports the activation of the AES core 130 out-of-order is the AES ALU 120.

AES Arithmetic Logic Unit

Figure 5:
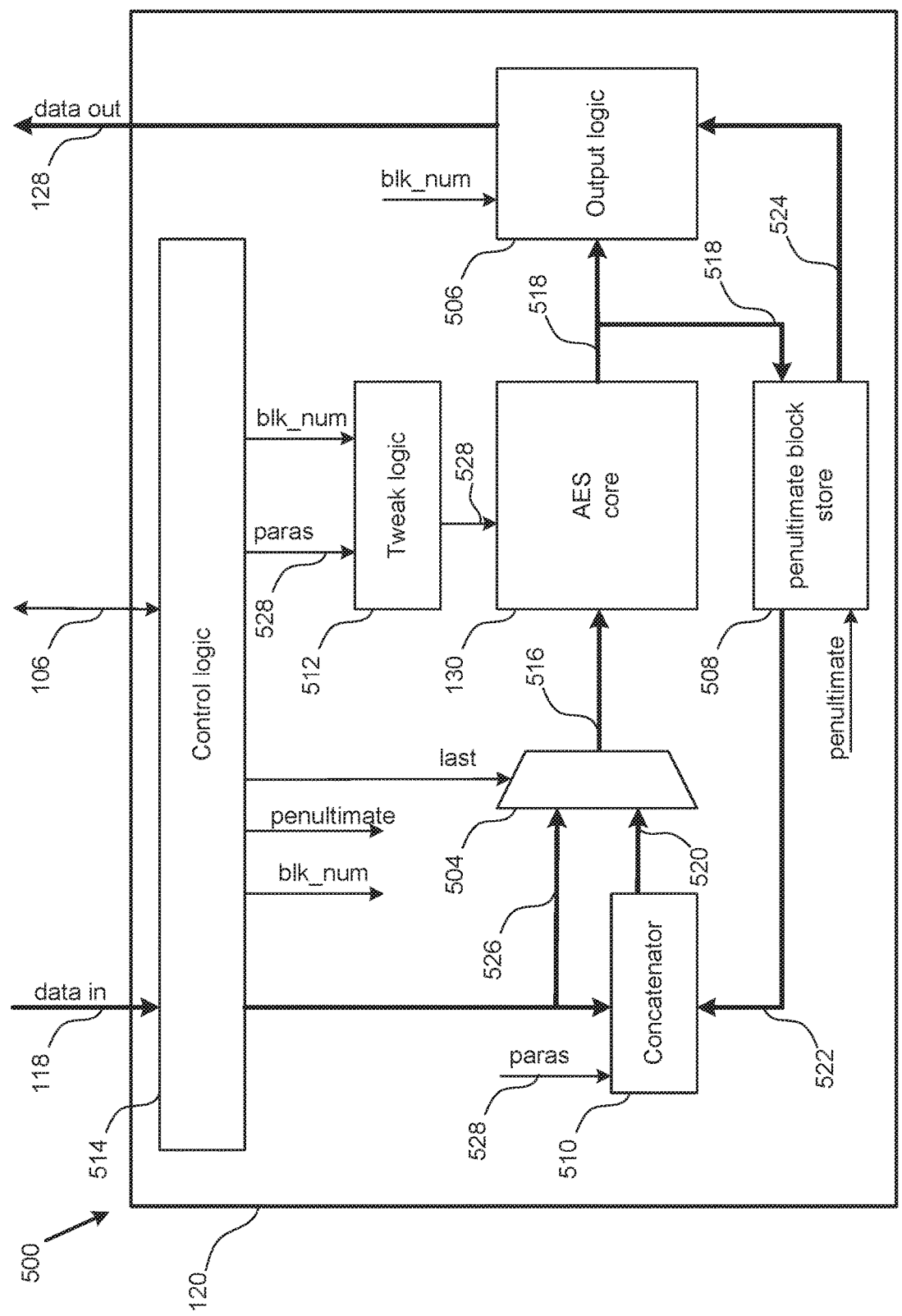
FIG. 5 is a block diagram illustrating components of an arithmetic logic unit, according to an embodiment.

FIG. 5 is a block diagram illustrating a subset of the components of the AES Arithmetic Logic Unit (ALU) 120, according to an embodiment. The AES ALU 120 comprises a pipeline controller. The pipeline controller comprises components which control the AES core 130 to perform encryption of a data object, with or without cipher text stealing, and perform decryption of a cipher text data object, with or without cipher text stealing.

Control Logic

The AES ALU 120 comprises a pipeline controller in the form of control logic 514, which controls the components of the AES ALU 120 to provide inputs to the AES core 130 and to route the output of the AES core 130 to the AES ALU data signal 128.

The AES core 130 comprises a cryptographic pipeline, which is configured to perform concurrent pipelined processing of a plurality of data blocks, such that a plurality of data blocks may be partially cryptographically processed along the cryptographic pipeline, in any clock cycle, depending upon the provision of data blocks at the input stage of the pipeline. Accordingly, the components of the AES ALU 120 control the AES core 130 to perform pipelined concurrent processing by providing data blocks as input to the AES core 130 and controlling the value and timing of control signals to the AES core 130.

In one embodiment, the control logic 514 provides controlling signals including: a 'blk_num' signal which indicates the number of the block in the sequence of blocks of a data object to be processed by the AES ALU; a 'last' signal which is active in response to the last block of the sequence of blocks of a data object being input into the AES core; a 'penultimate' signal which is active in response to the penultimate block of the sequence of blocks of a data object processed by the AES core being output from the AES core; and a set of parameter signals 528, labelled with the abbreviation 'paras' 528 in FIG. 5, which indicate parameters of the data object being processed by the AES core 130, such as the size of the data object.

Penultimate Block Store

The penultimate block store 508 comprises a register configured to store the penultimate processed block of output from the AES core 130 on signal 518. The penultimate block store 508 receives the penultimate input signal indicating whether the block output from the AES core 130, in the current clock cycle, is the penultimate (or before-last) processed block. If the processed block currently being output from the AES core 130 is the penultimate processed block, being the cryptographically processed version of the penultimate block of the sequence of blocks, the penultimate block store 508 stores a copy of the output of the AES core 130, as output on signal 518. In one embodiment, the penultimate block store 508 is a 16-byte register. In one embodiment, the penultimate block store 508 stores only the stolen portion of the penultimate processed block, wherein the size of the stolen portion is the size difference between the size of the last block and the set block size.

The AES ALU 120 further comprises a multiplexer 504 which selects from data input 526, which comprises data received on data input signal 118, and data input 520, which comprises a concatenation of the data received on data input signal 118 and stolen data from the penultimate block store 508.

Concatenator

The concatenator 510 is configured to concatenate the data received on data input signal 118 and stolen data from the penultimate block store 508, to produce a block of data, of block size, in accordance with cipher text stealing. This concatenated block of data becomes the last block, in the sequence of blocks, processed by the AES core.

The multiplexer 504 routes data from data input 526 to signal 516, in response to the 'last?' signal being inactive, and routes data from the data input 520 to signal 516, in response to the 'last?' signal being active.

Tweak Value

Some cryptographic algorithms are tweakable block ciphers, which means they use a tweak value to update the encryption mechanism for each block of plaintext data encrypted within a sequence of blocks. A corresponding update of the decryption mechanism, using a tweak value, is performed during decryption of cipher text encrypted using a tweakable block cipher.

A cipher operation for a given plaintext P and key K may be modelled as $C=E_K(P)$, whereas, in one embodiment, a block cipher that involves a tweak value is modelled as $C=E_K(T,P)$, where T is the value of the tweak.

The tweak value is affected by the logical position of a block being cryptographically processed, within the sequence of data blocks of a data object. In one embodiment, the tweak value used to cryptographically process the first block of a sequence is set to the result of encrypting the initialisation vector 330 with $Key_2$ 332. In one embodiment, the tweak value used to cryptographically process each of the non-first blocks of a sequence is calculated via a function that applies the tweak value of the preceding block. In another embodiment, tweak values start from an arbitrary integer and are assigned consecutively. In other embodiments, the tweak is otherwise adjusted for each block in the sequence of blocks.

Within the XTS-AES standard, the tweak value is a 128-bit element in a Galois Field (GF). More specifically, in one embodiment, the tweak value is an element in the Galois Field $GF(2^{128})$, which is defined by the irreducible polynomial $x^{128}+x^7+x^2+x+1$. According to the XTS-AES standard, all $GF(2^{128})$ elements are represented as a little-endian byte array.

Tweak Calculation

The AES ALU 120 comprises a tweak logic block 512 to calculate the tweak value for use by the AES core 130, in performing cryptographic processing. The tweak logic block 512 receives control signals from the control logic block 514, indicating parameters of the data object being processed by the AES ALU 120, and the position of the current data block being processed, within the sequence of data blocks of the data object.

On each clock cycle that data is input into the AES core 130, via signal 516, the tweak logic 512 updates the tweak value dependent upon the position of the data block in the sequence of data blocks currently being processed by the AES ALU 120. The tweak logic 512 provides the tweak value to the AES core 130, on signal 528, and the AES core 130 uses the updated tweak value to cryptographically process the data block received on signal 516.

The pipeline of the AES core 130 supports the concurrent pipelined processing of a plurality of data blocks. Accordingly, the timing of the provision of the updated tweak value on signal 528 relative to the timing of the provision of the data block on signal 516 depends upon the structure of the cryptographic pipeline within the AES core 130.

In one example, the AES core 130 is configured to apply the tweak value during the first stage of the cryptographic pipeline. In such an example, the control logic block 514 is configured to update the tweak value on signal 528 on the same clock cycle as providing the associated data block on signal 516. In another example, the AES core 130 is configured to apply the tweak value on one of the other stages of the cryptographic pipeline. In this other example, the AES core 130 is configured to delay the provision of the updated tweak value on signal 528, relative to the timing of the provision of the associated data block on signal 516, until the processing of the associated data block reaches the stage of the cryptographic pipeline in which the tweak value is applied.

In one embodiment, the tweak logic block 512 calculates the tweak value of the first block as the result of encrypting the initialisation vector 330 using $Key_2$ 332. In one embodiment, the tweak logic block 512 calculates the tweak value for each block after the first block, as a function of the first tweak value and a Data Unit Sequence Number, which is representative of the position of the block in the sequence of blocks. More specifically, in one embodiment, the tweak logic block 512 calculates the tweak values for each block in the sequence of blocks by modifying the first tweak value.

In one embodiment, the tweak logic 512 calculates the tweak value in accordance with the tweak calculation function $GF(2^{128})+Tx^n$, where GF is a Galois polynomial function, T is the tweak value for the first block in the sequence of blocks, x is a tweak modification function, and n is indicative of the position of the block in the sequence of blocks and represents the number of applications of the tweak modification function. The GF function provides further diffusion and ensures that blocks of identical plaintext data will not produce identical cipher text.

The tweak logic block 512 provides support for out-of-order activation of the AES core 130 by calculating the tweak value for each data block in the sequence of data blocks, in accordance with the position of that data block within the sequence of data blocks. Accordingly, as the AES core 130 cryptographically processes the penultimate block in a sequence of blocks, the tweak value provided to the AES core 130, on signal 528, by the tweak logic 512, is the tweak value specific to the penultimate block.

For calculation of the tweak value out-of-order, e.g. to calculate the tweak value of a penultimate block, the tweak logic block 512 applies the tweak modification function (T) multiple times. For example, in one embodiment, considering where n is the number of blocks preceding the penultimate block, the tweak logic block 512 applies the modification function (n−1) times to the first tweak value. The tweak logic block 512 is configured to apply the modification function (n−1) times to the first tweak value, to produce the tweak value for the penultimate block, in a single clock cycle.

The tweak logic 512 receives control signals from the control logic block 514, which enable the tweak logic 512 to determine the position of the current block being processed by the AES ALU 120 and to calculate the tweak value in accordance with that block position.

Output Logic

The AES ALU 120 further comprises output logic block 506, which routes the AES core output signal 518 to the data out signal 128. In one embodiment, the output logic block 506 includes a buffer, which buffers the output of the AES core 130 before outputting the data. The output logic block 506 performs two functionalities, namely: the output logic block 506 provides a data buffer to accommodate the single clock cycle data bubble caused by waiting for the penultimate results; and the output logic block 506 switches the order of the penultimate and last data blocks, in accordance with the XTS-AES standard. The output logic block 506 inserts the out-of-order penultimate processed block into the sequence of processed blocks output by the AES ALU 120.

Signal Timing Diagrams

Figure 6:
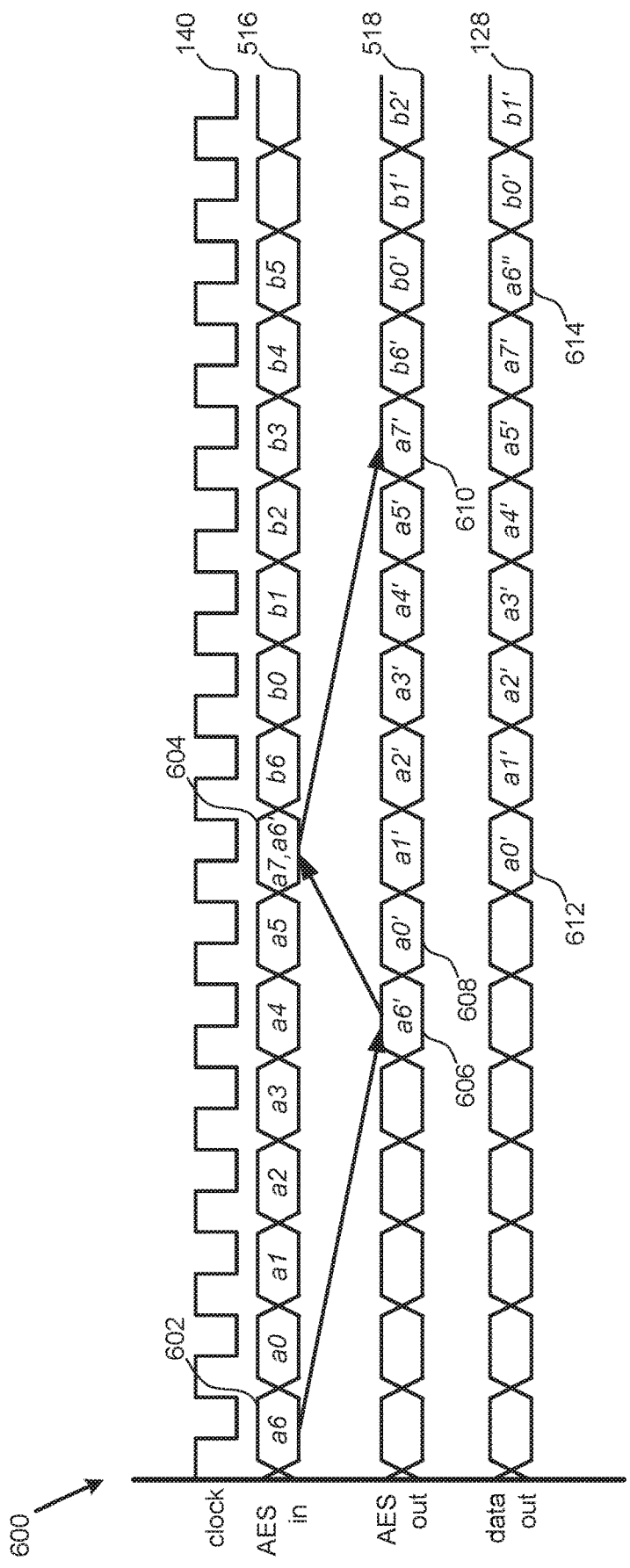
FIG. 6 is a signal timing diagram illustrating out-of-order processing of data blocks, wherein the penultimate block is processed first, according to an embodiment.
Figure 7:
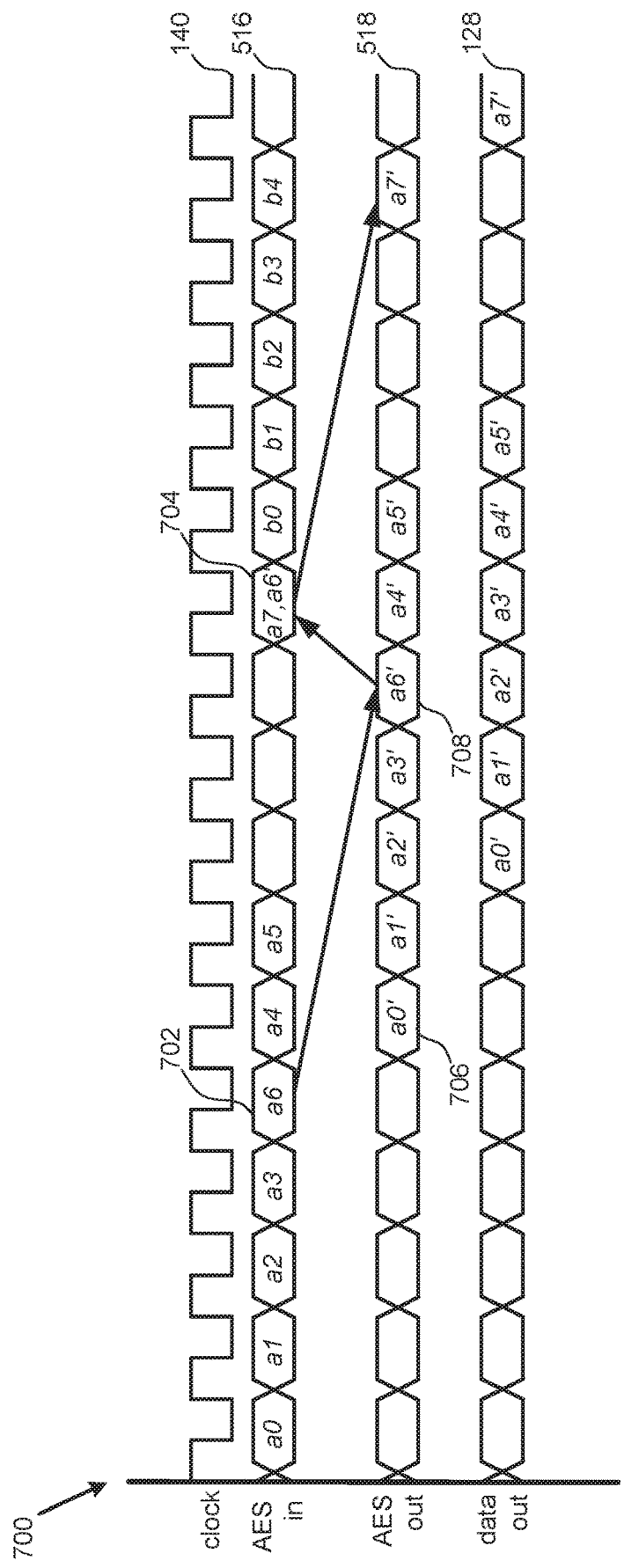
FIG. 7 is a signal timing diagram illustrating out-of-order processing of data blocks, wherein the penultimate block is not processed first, according to an embodiment.
Figure 8:
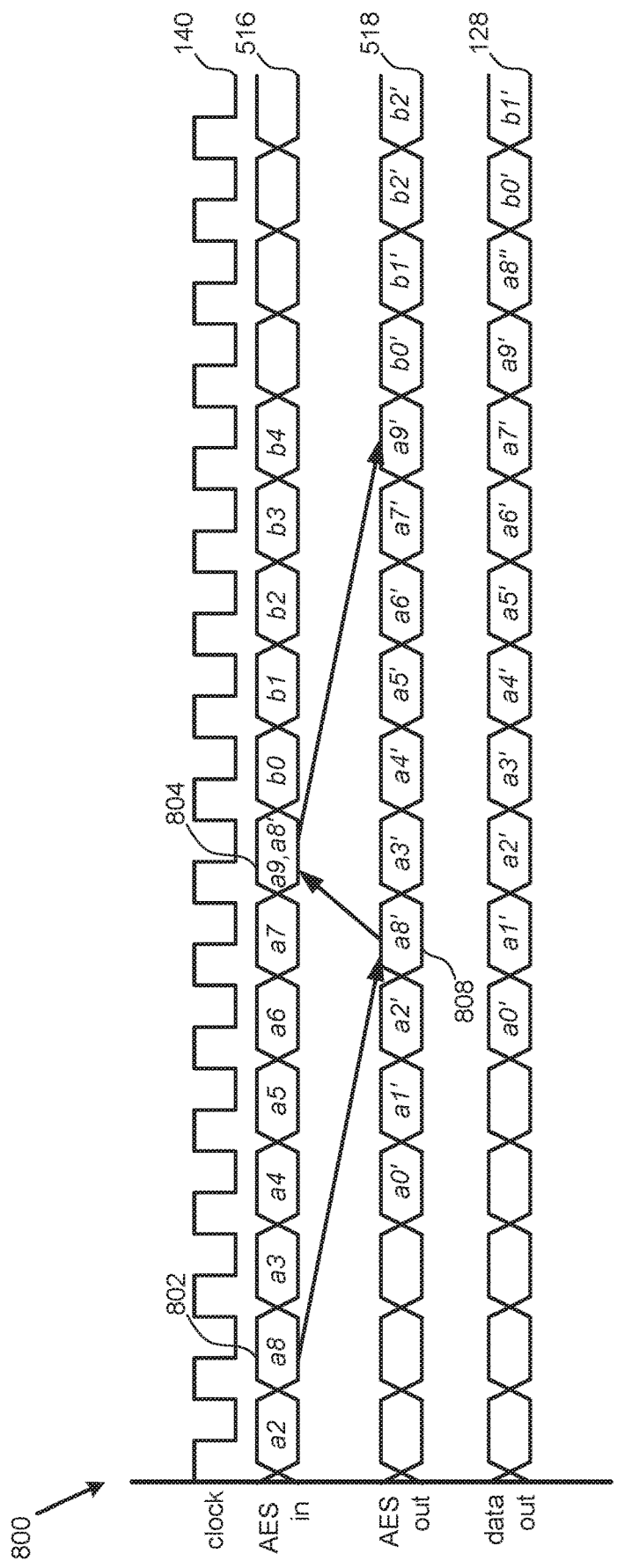
FIG. 8 is a signal timing diagram illustrating out-of-order processing of data blocks, wherein the penultimate block is processed at the latest clock cycle to avoid pipeline stalls, according to an embodiment.

FIGS. 6 to 8 are signal timing diagrams, 600, 700 and 800 respectively, which depict the timing of a subset of the signals of the AES ALU 120, during either encryption or decryption of a data object, according to embodiments.

More particularly, FIGS. 6 to 8 depict signal timing as the AES ALU 120 performs out-of-order encryption or decryption of data blocks to ameliorate or eliminate the pipeline stalls caused by the data dependency between the last and the penultimate data blocks. Each of FIGS. 6 to 8 depict a different mechanism of out-of-order processing of a sequence of data blocks, to ameliorate or eliminate the issue of pipeline stalls in the AES core 130.

For clarity of description, FIGS. 6 to 7 will be described with regard to the AES ALU 120 performing encryption of plaintext blocks a0 to a7, to produce cipher text blocks a0' to a7'; however, the signal timings of the AES core 130 as the AES core 130 performs decryption of cipher text blocks a0 to a7, to produce cipher text blocks a0' to a7', will be the same. Similarly, for clarity of description, FIG. 8 will be described with regard to the AES ALU 120 performing encryption of plaintext blocks a0 to a9, to produce cipher text blocks a0' to a9'; however, the signal timings of the AES core 130 as the AES core 130 performs decryption of cipher text blocks a0 to a9, to produce cipher text blocks a0' to a9', will be the same.

Each of signal timing diagrams, 600, 700 and 800, depict: a clock signal 130, upon which the components of the security engine 114 are clocked; an input data signal 516 to the AES core 130, which is configured to provide one block size of data to the AES core 130 each clock cycle; an output data signal 518 from the AES core 130, which is configured to output one block size of data from the AES core 130 each clock cycle; and a data out signal 128, which outputs data from the security engine 114 to the data controller 110 of the data storage device 100.

In signal diagrams 600 and 700, blocks a0 to a6 are of a size equal to the set block size set for the AES core 130. Last block, block a7, is of a smaller size than blocks a0 to a6. Accordingly, the AES ALU 120 applies cipher text stealing functionality in the process of performing either encryption or decryption of blocks a0 to a7. Similarly, in signal diagram 800, block a9 is of a smaller size than blocks a0 to a8, and the AES ALU 120 applies cipher text stealing functionality in the process of performing either encryption or decryption of blocks a0 to a9.

In the embodiments depicted by signal timing diagrams 600, 700 and 800, the AES core 130 has a pipelined architecture comprising six pipeline stages. In other embodiments, the AES core 130 may comprise a pipelined architecture comprising a different number of pipeline stages.

Penultimate Block First

In FIG. 6, the AES ALU control logic 514 provides the penultimate block of the block sequence a0 to a7, as the first block input into the AES core 130. The penultimate block is a6, as indicated by reference numeral 602. The AES ALU control logic 514 then inputs blocks a0 to a5 in succession, into the AES core 130, over the following five clock cycles. The AES core 130 performs concurrent pipelined processing of blocks a6 along with blocks a0 to a3, with each of the blocks being partially cryptographically processed within one of the five pipeline stages of the AES core 130.

The cipher text block a6', corresponding to plain text block a6, is output from the AES core 130, in clock cycle 606, as the first cipher text block corresponding to block sequence a0 to a7. Accordingly, cipher text block a6' is available to the AES core 130 prior to the input of plaintext block a7 to the AES core 130 in clock cycle 604.

The AES ALU 120 stores the cipher text block a6' in the penultimate block store 508. In clock cycle 604, the concatenator 510 concatenates the plaintext block a7 with a stolen portion of cipher text block a6' so that the concatenated result is equal to the set block size. Additionally, in clock cycle 604, the multiplexer 504 routes the concatenated result of a7 and the stolen portion of a6' to signal 516 for input into the AES core 130.

As cipher text block a6' (including the stolen portion) is available to the AES core 130 prior to the input of plaintext block a7 to the AES core 130, there is no stall of the AES core pipeline.

The AES ALU outputs encrypted data via data out signal 128. In the embodiment illustrated in FIG. 6, the output logic 506 comprises a buffer. Accordingly, the encrypted data is output in a one clock cycle delay starting with block a0', 612, and completing with block a6'', 614. Block a6'', 614, is a copy of encrypted block a6' with the bits that were 'stolen', to pad block a7 during encryption, replaced with zeros.

Penultimate Block Mid-Sequence

In FIG. 7, the AES ALU 120 inputs the penultimate block of the block sequence a0 to a7 into the AES core 130 earlier than the penultimate position, to reduce the number of clock cycles in which the AES core pipeline is stalled.

The penultimate block a6 is indicated by reference numeral 702. The AES ALU control logic 514 then inputs the penultimate block a6 mid-sequence in the sequence of blocks a0 to a7. The cipher text block a6', corresponding to plain text block a6, is output from the AES core 130, in clock cycle 708.

An AES ALU can activate the cryptography core to process the penultimate block mid-sequence, rather than first, if the AES ALU cannot access the penultimate block earlier. If the AES ALU inputs the penultimate block into the cryptography core at least x clock cycles before inputting the last block into the cryptography core, where x is the number of pipeline stages in the cryptography core, then there will be no data dependency stalls within the cryptography core. If the AES ALU inputs the penultimate block into the cryptography core less than x clock cycles before inputting the last block into the cryptography core, but at least 2 clock cycles before inputting the last block into the cryptography core, the number of clock cycles consumed by data dependency pipeline stalls will be reduced but not eliminated.

Penultimate Block in Last Position to Avoid Stalls

In FIG. 8, the AES ALU 120 inputs the penultimate block of the block sequence a0 to a7 into the AES core 130 at the latest position in the sequence to avoid data dependency stalls in the cryptography core pipeline. As the AES core 130 pipeline is six stages long, in the embodiment illustrated in FIG. 8, the AES ALU 120 inputs the penultimate block a8, 802, of the block sequence into the AES core 130 six cycles before inputting the last block into the AES core 130. Consequently, the penultimate processed block a8', 808, is available 1 clock cycle before the concatenated last block (a9,a8'), 804, is processed by the AES core 130.

AES Core Input Control

Figure 9:
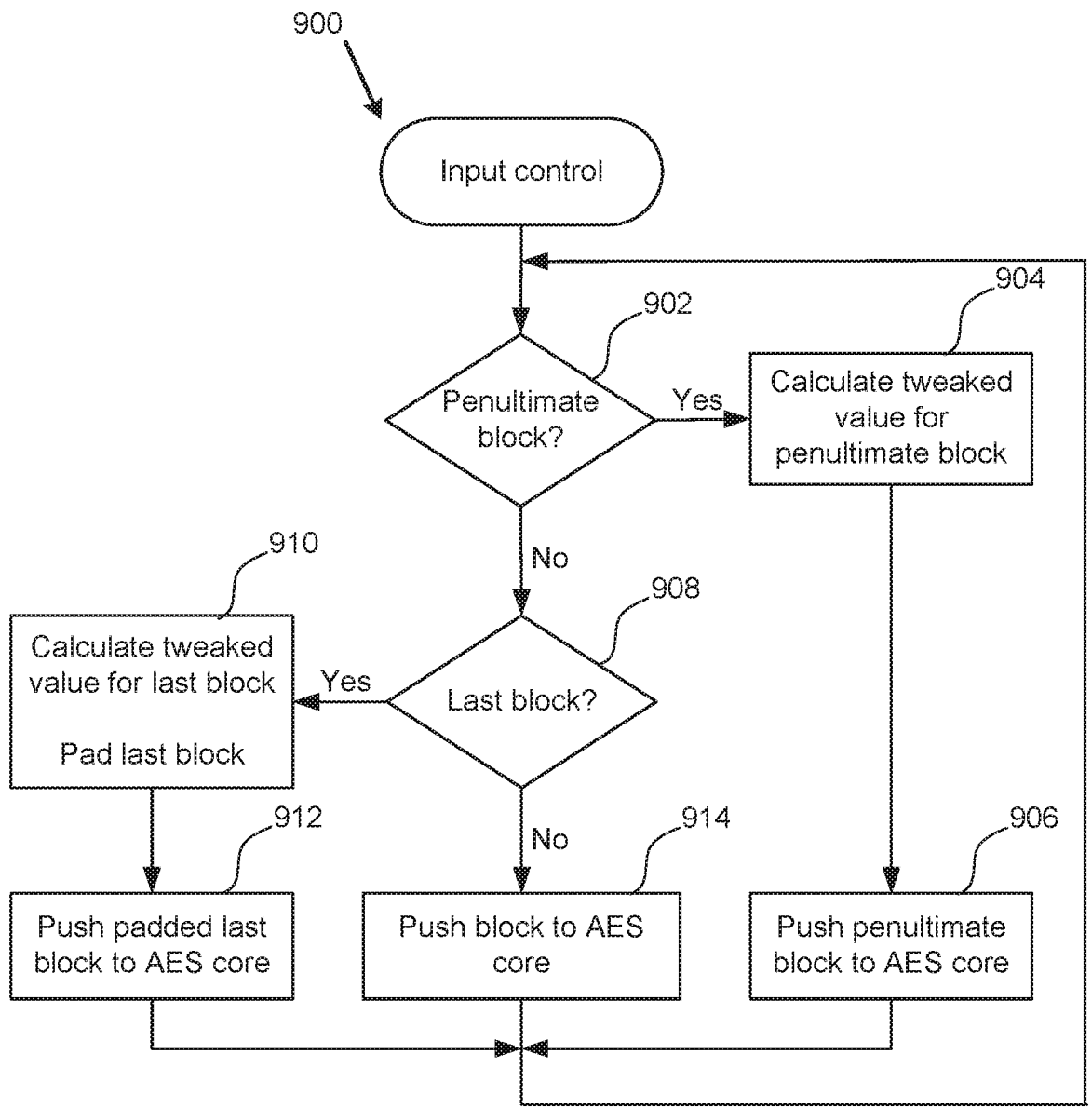
FIG. 9 is a flowchart illustrating steps of an arithmetic logic unit to configure a cryptography core to process a data block, according to an embodiment.

FIG. 9 is a flowchart of steps taken by the AES ALU 120 to configure the AES core 130 to cryptographically process each data block of a data object, according to an embodiment. For each data block processed by the AES core 130, the AES ALU 120 determines 902 whether the data block is the penultimate block in the sequence of blocks of the data object. If the data block is the penultimate block, the AES ALU 120 configures 904 the tweak logic block 512 to calculate the tweak value specific to the penultimate block. The AES ALU 120 then pushes 906 the penultimate block to the AES core 130 for cryptographic processing.

If, however, the data block is not the penultimate block, the AES ALU 120 determines 908 whether the data block is the last block in the sequence of blocks of the data object. If the data block is the last block, the AES ALU 120 configures 910 the tweak logic block 512 to calculate the tweak value specific to the last block. Additionally, the AES ALU 120 configures the concatenator 510 to pad the last block to the size of the set block size by concatenating the last block with a portion of the penultimate processed block, which is stored in the penultimate block store 508. The AES ALU 120 then pushes 912 the padded last block to the AES core 130 for cryptographic processing.

If, however, the data block is neither the penultimate block nor the last block, the AES ALU 120 pushes 914 the block directly to the AES core 130 for cryptographic processing, and the tweak logic block 512 determines the tweak value for the data block. In one embodiment, the tweak logic block 512 determines that the data block immediately follows previous data block pushed into the AES core 130 on the previous clock cycle. In other words, the data block is being processed in-order. Accordingly, the tweak logic block 512 performs normal tweak advancement by applying the tweak modification function to the tweak value for the previous data block.

AES Core Output Control

Figure 10:
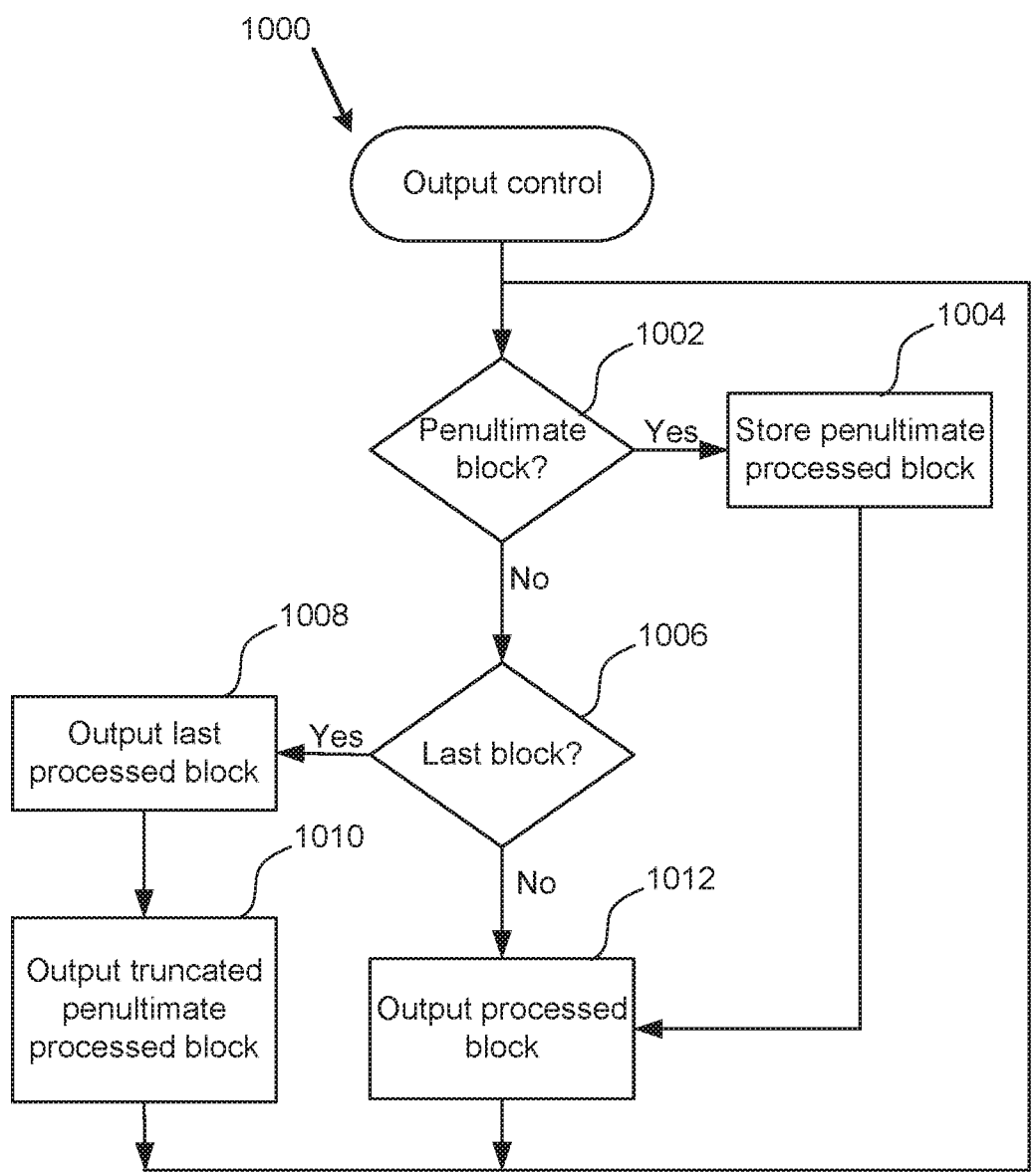
FIG. 10 is a flowchart of steps of an arithmetic logic unit to process the output of a cryptography core, according to an embodiment.

FIG. 10 is a flowchart of steps taken by the AES ALU 120 to process the output of the AES core 130 for each processed data block of a data object, according to an embodiment. For each processed data block output by the AES core 130, the AES ALU 120 determines 1002 whether the processed block is the penultimate processed block. If the processed block is the penultimate processed block, the AES ALU 120 stores 1004 at least a portion of the penultimate processed block in the penultimate block store 508.

If, however, the processed block is not the penultimate processed block, the AES ALU 120 determines 1006 whether the processed block is the last processed block in the sequence of processed blocks. If the processed block is the last processed block, the AES ALU 120 outputs the last processed block, then outputs 1010 the truncated penultimate processed block. (The truncated penultimate processed block comprises the portion of the penultimate processed block which was not used to pad the last block prior to cryptographic processing.)

If, however, the processed block is neither the penultimate block nor the last block, the AES ALU 120 outputs 1012 the processed block.

Cipher Text Transmission Order

Cryptographic algorithms, or modes thereof, specify a format for storing or transmitting cipher text of a data object, such that the data object can be correctly decrypted. One format defines storing the encrypted leading blocks in order, followed by the truncated penultimate block. Finally, the encrypted last block is stored at the end of the cipher text object.

Alternatively, the decryption engine can swap the position of the final two processed blocks, such that the last encrypted block is positioned just before the truncated encrypted penultimate block.

Transaction Layer Protocol

In one embodiment, the controller 104 utilises a transaction layer packet (TLP) protocol to read data from the host memory store via the PCIe bus 106, to improve utilisation of the PCIe bus 106. In one embodiment, the size of a TLP transfer is 64 or 128 bytes per transfer. In other embodiments, the size of the TLP transfers on the PCIe bus may be any arbitrary size, up to 4 k bytes.

The set block size for data objects processed by the security engine 114, in accordance with one embodiment, may be less than the size of a TLP transfer. For example, in response to the set block size being 16 bytes, a TLP transfer will transfer more than a single block of a data object to be processed by the security engine 114.

In one embodiment, the controller 104 reads an entire TLP transfer, including the a plurality of data blocks, from the host memory 103, and stores the plurality of data blocks in an internal buffer within the data storage device 100, for subsequent processing by the security engine 114.

In one embodiment, the TLP transfer comprises the penultimate data block, the last data block, and a plurality of leading data blocks. In another embodiment, the TLP transfer comprises the penultimate block and other data from the host memory store 103.

Out-of-Order Data Fetch

In one embodiment, the data storage device 100 fetches a data object from the host memory store 103 in an out-of-order manner. For example, the controller 104 first fetches the tail of the data object, which comprises at least the penultimate data block and the last data block. The tail of the data object may also comprise one or more leading data blocks and metadata associated with the data object.

The controller 104 then performs one or more fetch operations to fetch the remaining leading data blocks of the data object from the host memory store 103. Accordingly, the controller 104 fetches the blocks of the data object out-of-order.

In conjunction with the out-of-order data fetching, the security engine performs out-of-order cryptographic processing of the data blocks, where the penultimate block is cryptographically processed before at least one of the leading data blocks.

In another embodiment, the controller 104 first fetches a section of the data object, which comprises at least the penultimate data block. This section of the data object may also comprise one or more leading data blocks. The controller 104 then fetches the unfetched leading blocks, and then the controller 104 fetches a section of the data object which comprises the last block.

In another embodiment, the controller 104 fetches sections of the data object in an order such that the penultimate block of the data object is available to be cryptographically processed by the AES ALU 120 before the AES ALU 120 cryptographically processes the last block of the data object.

Avoiding the Clock Cycle Cost of CTS

As noted above with reference to FIG. 4, cryptographically processing data blocks, for which cipher text stealing is required, in order results additional clock cycles being consumed due to pipeline stalls.

Advantageously, by activating the cryptography core to process the penultimate block out-of-order, such that the penultimate processed block is available to the cryptographic core at an earlier clock cycle, the number of clock cycles consumed to process a data object may be reduced.

Accordingly, through the application of out-of-order activation of the cryptographic core, the clock cycles consumed to cryptographically process a data object, for which cipher text stealing is not required, may be the same as the clock cycles consumed to cryptographically process a data object of a slightly smaller size, for which cipher text stealing is required.

More specifically, through the application of out-of-order activation of the cryptographic core, the clock cycles required to cryptographically process a data object of size (n*set_block_size) are the same as the clock cycles required to cryptographically process a data object of ((n−1)*set_block_size)<size<(n*set_block_size), so long as the penultimate block is input to the cryptographic core at least x clock cycles before inputting the last block into the cryptography core, where x is the number of pipeline stages in the cryptography core It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

It will be appreciated by persons skilled in the art that the present invention is not limited to what has been particularly shown and described herein. Rather, the scope of the present invention is defined only by the claims that follow.

The invention claimed is:

1. A data storage device comprising:
a non-transitory storage medium; and
a cryptographic processing unit, integrated with the data storage device, and configured to:
receive a first portion of a data object;
receive a second portion of the data object, wherein:
the first portion includes a penultimate data block; and
the second portion includes at least one leading data block of one or more leading data blocks; and
the first portion is received before the second portion; and
perform cryptographic processing of the data object to produce a processed data object, wherein:
the data object comprises a sequence of data blocks, including:
the one or more leading data blocks;
the penultimate data block; and
a last data block;
the cryptographic processing unit comprises:
a memory store;
a cryptographic processing pipeline; and
a pipeline controller;
the pipeline controller is configured to control the cryptographic processing pipeline to perform the steps of:
a) cryptographically process the penultimate data block, to produce a penultimate processed data block, and store a portion of the penultimate processed data block in the memory store;
b) cryptographically process at least one of the one or more leading data blocks, to produce one or more processed leading data blocks; and
c) cryptographically process a concatenation of the last data block and the portion of the penultimate processed data block, to produce a last processed data block; and
the pipeline controller is further configured to control the cryptographic processing pipeline to start to perform step b) before the cryptographic processing pipeline completes step a).

2. The data storage device of claim 1, wherein performing cryptographic processing comprises performing encryption.

3. The data storage device of claim 1, wherein performing cryptographic processing comprises performing decryption.

4. The data storage device of claim 1, wherein:
each leading data block has a size equal to a set block size;
the penultimate data block has a size equal to a set block size; and
the last data block has a size less than the set block size.

5. The data storage device of claim 1, wherein the cryptographic processing pipeline comprises a plurality of pipeline stages comprising, at least, a first stage and a second stage.

6. The data storage device of claim 5, wherein the pipeline controller is further configured to control the first stage of the cryptographic processing pipeline to start to perform step b) while the second stage of the cryptographic processing pipeline continues to perform step a).

7. The data storage device of claim 1, wherein the cryptographic processing pipeline is clocked by a clock signal.

8. The data storage device of claim 7, wherein the cryptographic processing pipeline stores the portion of the penultimate processed data block in the memory store at least one clock cycle of the clock signal before an input stage of the cryptographic processing pipeline starts to perform step c).

9. The data storage device of claim 1, wherein the cryptographic processing pipeline processes all of the one or more leading data blocks in step b).

10. The data storage device of claim 1, further comprising:
   an output buffer configured to store the penultimate processed data block; and
   an output port configured to:
      output processed data blocks from the cryptographic processing unit, and
      output the last processed data block before outputting the penultimate processed data block, stored in the output buffer.

11. The data storage device of claim 1, further comprising an input port in communication with a source of data blocks of the data object, wherein the cryptographic processing unit is configured to request and receive data blocks of the data object from the source via the input port.

12. The data storage device of claim 11, wherein the cryptographic processing unit is further configured to:
   request the first portion of the data object from the source via the input port; and
   then request the second portion of the data object from the source via the input port.

13. The data storage device of claim 1, wherein step a) comprises determining a tweak value associated with the penultimate data block.

14. The data storage device of claim 13, wherein the cryptographic processing unit is configured to determine the tweak value associated with the penultimate data block before performing step a).

15. The data storage device of claim 1, wherein the cryptographic processing unit is configured to calculate a tweak value for each data block in the sequence of data blocks.

16. The data storage device of claim 1, wherein the cryptographic processing unit is configured to perform encryption in accordance with an XTS-AES encryption algorithm.

17. The data storage device of claim 1, wherein the cryptographic processing unit is configured to perform decryption in accordance with an XTS-AES decryption algorithm.

18. A method for performing cryptographic processing of a data object to produce a processed data object, wherein:
   the data object comprises a sequence of data blocks, including,
      one or more leading data blocks;
      a penultimate data block; and
      a last data blocks;
   the method comprises ordered steps of:
      a) receiving a first portion of the data object, the first portion including the penultimate data block;
      b) receiving a second portion of the data object, the second portion including at least one leading data block of the one or more leading data blocks;
      performing cryptographic processing of penultimate data block to produce a penultimate processed data block and store a portion of the penultimate processed data block in a memory store;
      d) performing cryptographic processing of at least one of the one or more leading data blocks to produce one or more processed leading data blocks; and
      e) performing cryptographic processing of a concatenation of the last data block and the portion of the penultimate processed data block stored in the memory store to produce a last processed data block; and
   step d) is started before step c) is completed.

19. The method of claim 18, wherein the method is performed by a cryptographic unit comprising:
   a memory store;
   a hardware circuitry pipeline configured to encrypt a plaintext data block to produce a cipher text block; and
   a pipeline controller configured to control the pipeline.

20. A data storage device for performing cryptographic processing of a data object to produce a processed data object, wherein:
   the data object comprises a sequence of data blocks, including,
      one or more leading data blocks;
      a penultimate data block; and
      a last data block;
   the data storage device comprises means for:
      a) receiving a first portion of the data object, the first portion including the penultimate data block;
      b) receiving a second portion of the data object, the second portion including at least one leading data block of the one or more leading data blocks;
      c) cryptographically processing the penultimate data block, to produce a penultimate processed data block, and storing a portion of the penultimate processed data block in a memory store;
      d) cryptographically processing at least one of the one or more leading data blocks, to produce one or more processed leading data blocks; and
      e) cryptographically processing a concatenation of the last data block and the portion of the penultimate processed data block, to produce a last processed data block,
   the first portion is received before the second portion; and
   step d) is started before step c) is completed.

* * * * *